US009774591B2

(12) United States Patent
Paya et al.

(10) Patent No.: US 9,774,591 B2
(45) Date of Patent: Sep. 26, 2017

(54) PASSWORD MANIPULATION FOR SECURE ACCOUNT CREATION AND VERIFICATION THROUGH THIRD-PARTY SERVERS

(71) Applicant: Airbnb, Inc., San Francisco, CA (US)

(72) Inventors: Ismail Cem Paya, San Francisco, CA (US); Kevin Nguyen, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 86 days.

(21) Appl. No.: 14/515,499

(22) Filed: Oct. 15, 2014

(65) Prior Publication Data
US 2016/0112396 A1    Apr. 21, 2016

(51) Int. Cl.
*H04L 29/06* (2006.01)
*H04L 9/32* (2006.01)
*H04L 9/08* (2006.01)

(52) U.S. Cl.
CPC .......... *H04L 63/083* (2013.01); *H04L 9/0897* (2013.01); *H04L 9/321* (2013.01); *H04L 9/3226* (2013.01); *H04L 63/0823* (2013.01)

(58) Field of Classification Search
CPC ..... H04L 9/0897; H04L 9/3226; H04L 9/321; H04L 63/0823; H04L 63/083
USPC ......................................... 713/156, 183–184
See application file for complete search history.

(56) References Cited

U.S. PATENT DOCUMENTS

| 7,360,091 | B2 * | 4/2008 | Aikawa | G06Q 20/06 |
| | | | | 705/13 |
| 7,631,195 | B1 | 12/2009 | Yu et al. | |
| 8,239,691 | B2 * | 8/2012 | Watanabe | G06F 21/80 |
| | | | | 713/182 |
| 8,752,148 | B1 * | 6/2014 | Vipond | H04L 9/3228 |
| | | | | 713/168 |
| 8,824,670 | B2 * | 9/2014 | Icart | H04L 9/3066 |
| | | | | 380/278 |
| 9,049,010 | B2 * | 6/2015 | Jueneman | G06F 21/32 |
| 9,092,385 | B2 * | 7/2015 | Resch | H04L 9/085 |
| 2002/0099942 | A1 * | 7/2002 | Gohl | G06F 21/31 |
| | | | | 713/169 |
| 2009/0307495 | A1 * | 12/2009 | Matsuo | H04L 9/002 |
| | | | | 713/171 |
| 2010/0150343 | A1 * | 6/2010 | Rombouts | H04L 9/002 |
| | | | | 380/44 |
| 2012/0183139 | A1 | 7/2012 | Matsuo | |
| 2012/0284506 | A1 * | 11/2012 | Kravitz | G06Q 40/00 |
| | | | | 713/151 |
| 2013/0212385 | A1 * | 8/2013 | Schechter | G06F 21/31 |
| | | | | 713/168 |

(Continued)

OTHER PUBLICATIONS

PCT International Search Report and Written Opinion, PCT Application No. PCT/US2015/045552, Nov. 19, 2015, 13 pages.

*Primary Examiner* — Saleh Najjar
*Assistant Examiner* — Feliciano Mejia
(74) *Attorney, Agent, or Firm* — Fenwick & West LLP

(57) ABSTRACT

A method and system for deterring attacks at potential breach points between servers and an account and login server for creating and subsequent verification of accounts. Various cryptographic primitives are used to manipulate passwords to generate verifiers. The verifiers are used with external hardware security modules (HSMs) to eliminate HSMs and intermediate steps between the HSM and login servers as potential breach points.

28 Claims, 5 Drawing Sheets

(56) References Cited

U.S. PATENT DOCUMENTS

2014/0032922 A1  1/2014  Spilman
2015/0046998 A1* 2/2015  Harwood ................ G06F 21/62
                                                  726/7

* cited by examiner

PASSWORD MANIPULATION FOR SECURE ACCOUNT CREATION AND VERIFICATION THROUGH THIRD-PARTY SERVERS

BACKGROUND

This description generally relates to online cryptography, and more particularly to securing online account creation and verifying account logins.

User accounts maintained by an online computer servers are generally vulnerable to passive and active attacks by third parties. If such a server is breached, information associated with an account may be accessible to a malicious actor. To prevent breaches, account creation and login systems have grown more secure over time. One tool in breach prevention is using one or more cryptographic primitives to securely store passwords. Cryptographic primitives include using salts, one way functions (e.g., hash function), cryptographic operations (e.g., encryption, decryption), symmetric cryptography schemes, and asymmetric (or public key) cryptography schemes. Another major tool in breach prevention is using physically distinct security hardware modules to perform various parts of the account creation and login verification processes, including applying cryptographic primitives as mentioned above. For example, the term hardware security module (HSM) specifically refers to a specially designed server that securely stores digital keys and perform cryptographic processing.

However, despite advances in cryptographic primitives and security hardware, many account and login servers are still vulnerable to breach. For example, an account login system may include a login server where passwords are stored in a password database, and where cryptographic processing is performed on a separate HSM remotely coupled to the login server. In this system, it is possible for a malicious actor to obtain a data dump of the password database, and synchronously or asynchronously temporarily obtain the ability to make encryption/decryption calls to the HSM. In this instance, despite having only temporary access to the HSM, it is possible for the malicious actor to use brute force to crack the password database offline based on the decryptions performed during the temporary access to the HSM.

SUMMARY

A user can create an account with an online system and the online system verifies subsequent logins to the account for the user, limiting access to those with permission to access the account. Account creation and account verification is performed by a trusted server managed by the online system and a third-party server.

To deter attacks at potential breach points between the servers, data transferred between the servers during creation and subsequent verification of accounts can be chosen and manipulated such that it is meaningless to a malicious actor intercepting exchanged data. During account creation, rather than storing the password, a trusted server stores data such as a verifier generated by deliberately masking the cryptographic password (e.g., the password encrypted using cryptographic operations) with random data (e.g., a random number). The trusted server can also store the random number in association with the corresponding verifier. During account verification, a complementary verifier is generated for the received password in a similar manner and that manipulated, partially random data is used for exchanges between the servers. The complementary verifier is further manipulated by the third-party server using one or more digital keys and various cryptographic operations and the trusted server performs various additional obfuscations and comparisons with the further manipulated complementary verifier.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein

DETAILED DESCRIPTION

I. System Overview

Figure 1:
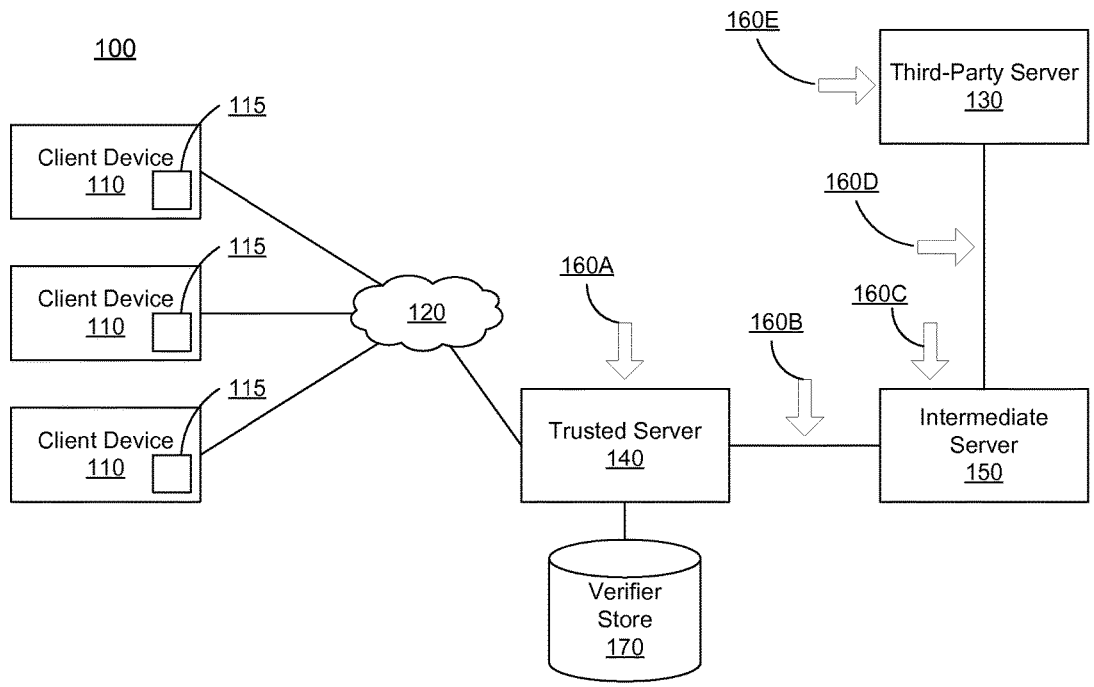
FIG. 1 is a block diagram of a computing environment for account creation and login using a trusted server and a third-party server, according to one embodiment.

FIG. 1 is a block diagram of an online computing environment 100 including an account and login system allowing users to create accounts and login to the those accounts. The account and login system includes a trusted server 140 that interfaces with client devices 110 and a third-party server 130 to create accounts and verify subsequent logins to the created accounts. The trusted server 140 is associated with a verifier store 170 and can be associated with additional servers as well that perform some of the functionality provided by the trusted server 140. Other computer systems may also exist between these computer servers, as represented in FIG. 1 by network 120 and intermediate server/s 150.

Users use client devices 110 to interact with the trusted server 140. A client device 110 can be any device that is or incorporates a computer such as a personal computer (PC), a desktop computer, a laptop computer, a notebook, a smartphone, or the like. A computer is a device having one or more general or special purpose processors, memory, storage, and networking components (either wired or wireless). The device executes an operating system, for example, a Microsoft Windows-compatible operating system (OS), Apple OS X or iOS, a Linux distribution, or Google's Android OS. In some embodiments, the client device 110 may use a web browser 115, such as Microsoft Internet Explorer, Mozilla Firefox, Google Chrome, Apple Safari and/or Opera, as an interface to interact with the trusted server 140. In other embodiments, the client device 110 can execute a dedicated application for accessing the trusted server 140.

The network 120 represents the communication pathways between client devices 110 (e.g., users) and the trusted server 140. In one embodiment, the network is the Internet. The network can also utilize dedicated or private communication links (e.g. WAN, MAN, or LAN) that are not necessarily part of the Internet. The network uses standard communications technologies and/or protocols.

The trusted server 140 controls the account creation and account login processes. To safeguard the trusted server 140, which includes its own security measures that are not described herein, a separate entity such as the verifier store 170 stores all of the user's personal account data (e.g., account ID, password). Also, separate servers can perform various processes of the account creation and login verification. Thus, the trusted server 140 would be a single point whose breach would be a major risk to its owner allowing the malicious actor would have access to all the data needed to access user accounts.

To ensure that user data cannot be accessed by breaching any one server, the account creation and login processes are carried out using both the trusted server 140 and a remotely coupled third-party server 130 that is associated with the trusted server 140. In one embodiment, information used to verify logins to accounts can be stored separately on the verifier store 170. To further ensure that any account data accessed by a malicious actor is not easily read or decrypted, both the account creation and login verification processes involve multiple cryptographic primitives such as encryptions, decryptions, hashing, truncation, and masking that are variously performed by the trusted 140 and third-party servers 130. In various embodiments, the cryptographic primitives can be performed on other servers as well. The trusted server 140 comprises additional components and modules that are described below.

The third-party server 130 communicates with the trusted server 140, for example, through the intermediate server 150 and facilitates the account creation and login verification processes by safeguarding digital keys (e.g., private keys in a public key cryptography scheme) and in some cases by performing some (though not necessarily all) of the cryptographic primitives (e.g., encryption, decryption) involved in account creation and login verification. The third-party server 130 includes a crypto processor. A crypto processor is a computing device such as a dedicated computer, system-on-a-chip, or microprocessor that can be attached to another computer or server as, for example, a plug-in card or an external device. The crypto processor is associated with a digital key and performs requested crypto processing tasks or cryptographic primitives such as cryptographic operations (e.g., decrypting). In one embodiment, a crypto processor included in the third-party server 130 is a hardware security module (HSM) that can be accessed (e.g., rented) through systems such as AMAZON WEB SERVICES (AWS) CLOUDHSM. The third-party server 130 can use a variety of cryptography schemes including symmetric key cryptography schemes and public key cryptography schemes. However, there is a potential risk that the crypto processor performed a particular operation that the third-party server 130 claims was performed by the crypto processor.

There is also a potential risk that arises inherently from the fact that the third-party server 130 is physically remote and only communicatively coupled to the trusted server 140. First, there is a risk that a malicious actor will pretend to be the third-party server 130 in order to attempt to breach account data. Additionally, a malicious actor may monitor communications between the trusted server 140 and the third-party server 130. In addition, it is not always clear whether the third-party server 130 performed a particular operation that the intermediate server 150 claims was performed by the third-party server 130. It is assumed that the trusted server 140 is under the control and direction of the entity responsible for the account creation and login verification processes (e.g., a business), and thus is in the best position to prevent and mitigate breaches to server 140. The trusted 140 and third-party servers 130 could instead be merely referred to as a first and second server, or a business server and a HSM, respectively.

To increase the security of communications between the two servers, the account creation and login verification processes described herein use a public key cryptography scheme to exchange information. A public key cryptography scheme can be an encryption/decryption scheme that requires two keys or a key-pair—a public key and a private key. The trusted server 140 has access to the public key, but only the third-party server 130 has access to the private key. However, public key cryptography systems are not foolproof. FIG. 1 further illustrates example points of possible breach 160 into the system. The third-party server 130 itself 160E or the connections 160B and 160D between servers 130 and 140 are vulnerable to a malicious actor if they record the output of the trusted server 140, the third-party server 130, or any intermediate servers 150 in between the two servers 130 and 140. Further, if security on an intermediate server 150 is relatively lax, a malicious actor can install software code 160C on the intermediate server 150 to record communications between servers 130 and 140.

For example, the malicious actor can associate a user requesting a login to the trusted server 140 with the output of the trusted server 140 (e.g., encrypted data), and the response of the third-party server 130 thereto (e.g., decrypted data such as a password or a verifier). The malicious actor can then access the account based on the association. Other variants on this outcome are also possible, such as the malicious actor pretending to be the third-party server 130, or the malicious actor gaining access to the third-party server 130 long enough to make calls to the third-party server 130 through the intermediate server 150. Thus, if the malicious actor has an encrypted password, then this gained access allows the malicious actor to make calls to the third-party server 130 to decrypt the encrypted password, essentially making use of an encryption pointless.

In order to safeguard against these kinds of situations, and as described further in conjunction with FIGS. 2-6, the data being transferred between the servers 130, 140 and 150 can be chosen and manipulated such that it is meaningless to a malicious actor listening. Further, rather than storing the password in the verifier store 170, the trusted server 140 instead stores data referred to as a verifier generated by deliberately masking the cryptographic password with random data (e.g., a random number). The verifier store 170 can also store the random number rNum in various embodiments in association with a corresponding verifier. Herein, the verifier is referred to as V and the random number is referred to as rNum. Thus, the pair <V,R> is defined as an association. Generally, masking refers to the process of obfuscating a first item by mathematically combining it with a second item unrelated to the first via a mathematical operation. Examples are provided further below. The manipulated, partially random data is the data used for exchanges with the third-party server 130 rather than the password or a pure encryption thereof. The third-party server 130 then uses one or more digital keys to perform cryptographic operations (e.g., encryptions and decryptions), and performs various other obfuscations and comparisons by primarily working with the meaningless data or verifier rather than the original password. As a result, even if the third-party server 130 is breached, the data or verifier obtained does not reveal any account information.

Additional safeguard measures may also be used, in order to further obscure the data being exchanged. Techniques such as blinding, padding, or use of multiple one-use random numbers corresponding to the number of login attempts allotted can be used to further randomize or make meaningless the exchanged data.

II. Trusted Server Overview

Figure 2:
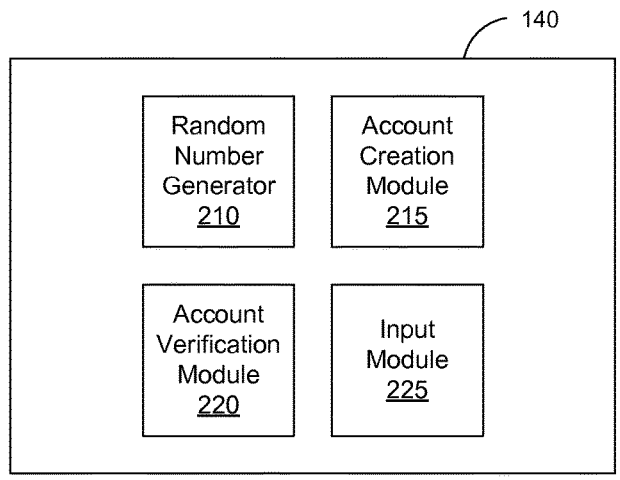
FIG. 2 is a block diagram of the logical components of a trusted server, according to one embodiment.

FIG. 2 is a block diagram of the logical components of a trusted server 140, according to one embodiment. The trusted server 140 includes a random number generator 210, an account creation module 215, an account verification module 220 and an input module 225. In other embodiments, additional servers can perform various functionality of the trusted server 140.

The input module 225 receives a plaintext password and account identifier (ID) (e.g., username) to create or access an account on the trusted server 140. The input module 225 can also receive additional information for creating an account such as security checks (e.g., questions and answers for reinstating access), contact information, user preferences, user geographic location, and so on. The account being created can also be associated with an account identifier (ID) by the trusted server 140 and the account ID can be based on the received additional information. Once the account creation or login verification process is completed successfully, the input module 225 communicates with other modules (not described) to carry out tasks on the larger system associated with the trusted server 140. If the verification process is not completed successfully, the input module 225 directs the client device 110 to provide input again, often only a finite number of times out of security concerns.

The random number generator 210 generates random or seemingly random numbers using any existing random number generation method, and is one means for doing so. Some methods include a random number table, the Yarrow method, the Fortuna, a pseudorandom number generator (PRNG), a hardware (true) random number generator (TRNG), random number servers, PRNG application programming interfaces (APIs), random number generators using external entropy, or any other suitable method that provides numbers in a seemingly random pattern. The generated random number can be a binary number, a real number, a negative number, or any other suitable number. For example, the number can be any suitable number that can be converted to a binary number. The function of the random number generator 210 can be provided by a system external to the trusted server 140.

The account creation module 215 performs one or more cryptographic operations on passwords during account creation. Specifically, the account creation module 215 receives an account ID and a new plaintext password P from the input module 225, obtains a new random number rNum from the random number generator 210, and generates a verifier for storage by the verifier store 170 using the random number rNum and the plaintext password P. To generate the verifier, generally any known cryptographic primitives may be used as part of the process, including hashing, salting, masking, blinding, symmetric cryptography, public key cryptography, bitwise computation, padding or any other suitable technique not mentioned explicitly herein. In addition to the random number rNum and the plaintext password P, the verifier may also include bits representing padding bits, hashes, or other artifacts of the cryptographic process used.

To generate the verifier, the account creation module 315 is configured to communicate with the third-party server 130. The exact process used for generation may vary by implementation. In the following two paragraphs, two embodiments for creating accounts are described corresponding to FIGS. 3 and 5, respectively.

Figure 3:
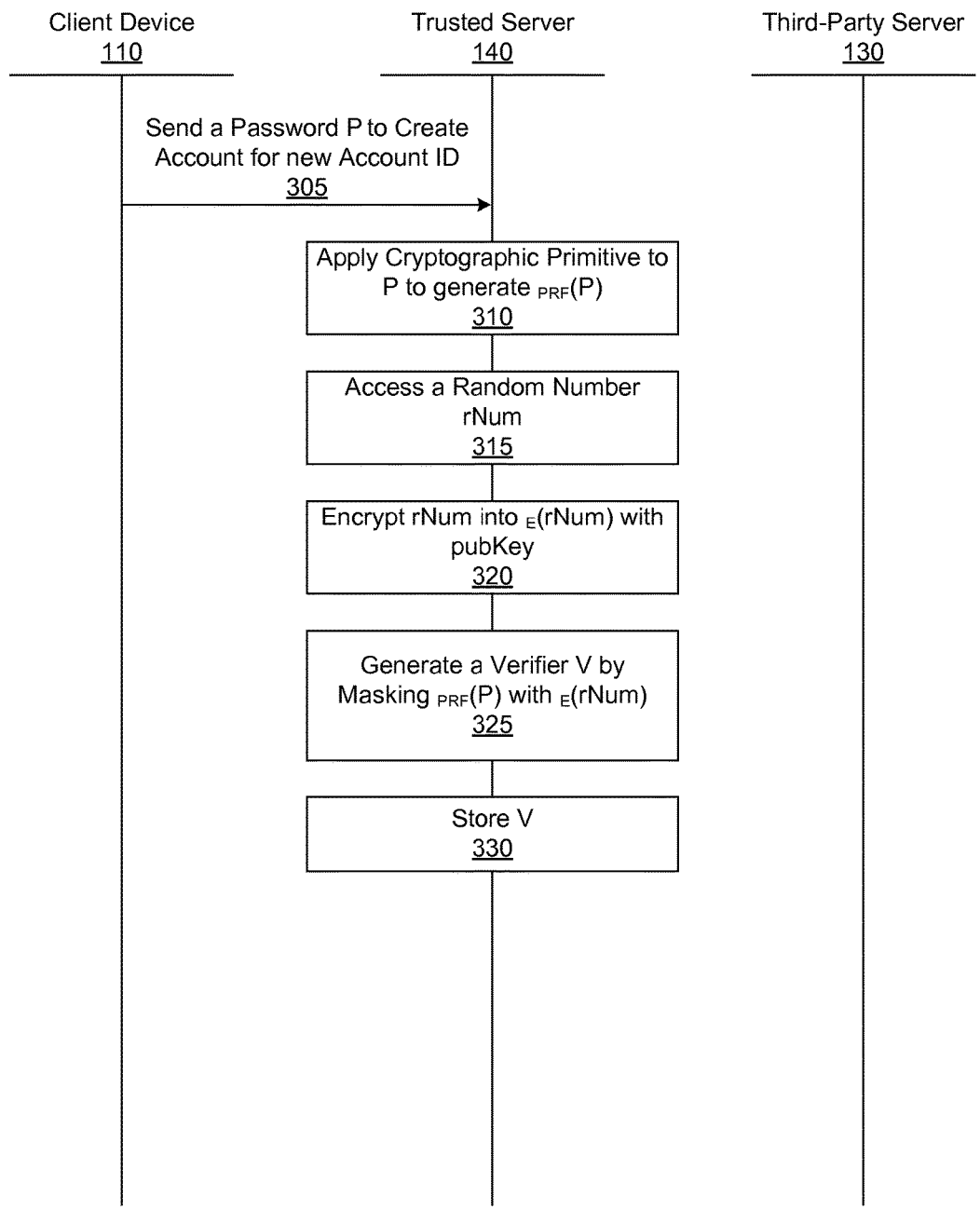
FIG. 3 is an interaction diagram of a method for securely creating an account using both a trusted server and a third-party server where at least some encryption is performed on the third-party server, according to one embodiment.

In one embodiment, the trusted server 140 applies one or more cryptographic primitives to the plaintext password P and the random number rNum is separately encrypted using a public key cryptographic operation. Additional schemes can be used to strengthen the encryption including padding schemes. These two pieces of data are then cryptographically combined (or masked) together into a verifier V by the trusted server 140 and stored in the verifier store 170. In this embodiment, there are at least three cryptographic primitives taking place to generate the verifier and all three cryptographic primitives take place on the trusted server 140. In the embodiment of FIG. 3, the verifier is stored, for example, in the verifier store 170. This example embodiment is further described with respect to FIG. 3 below.

Figure 5:
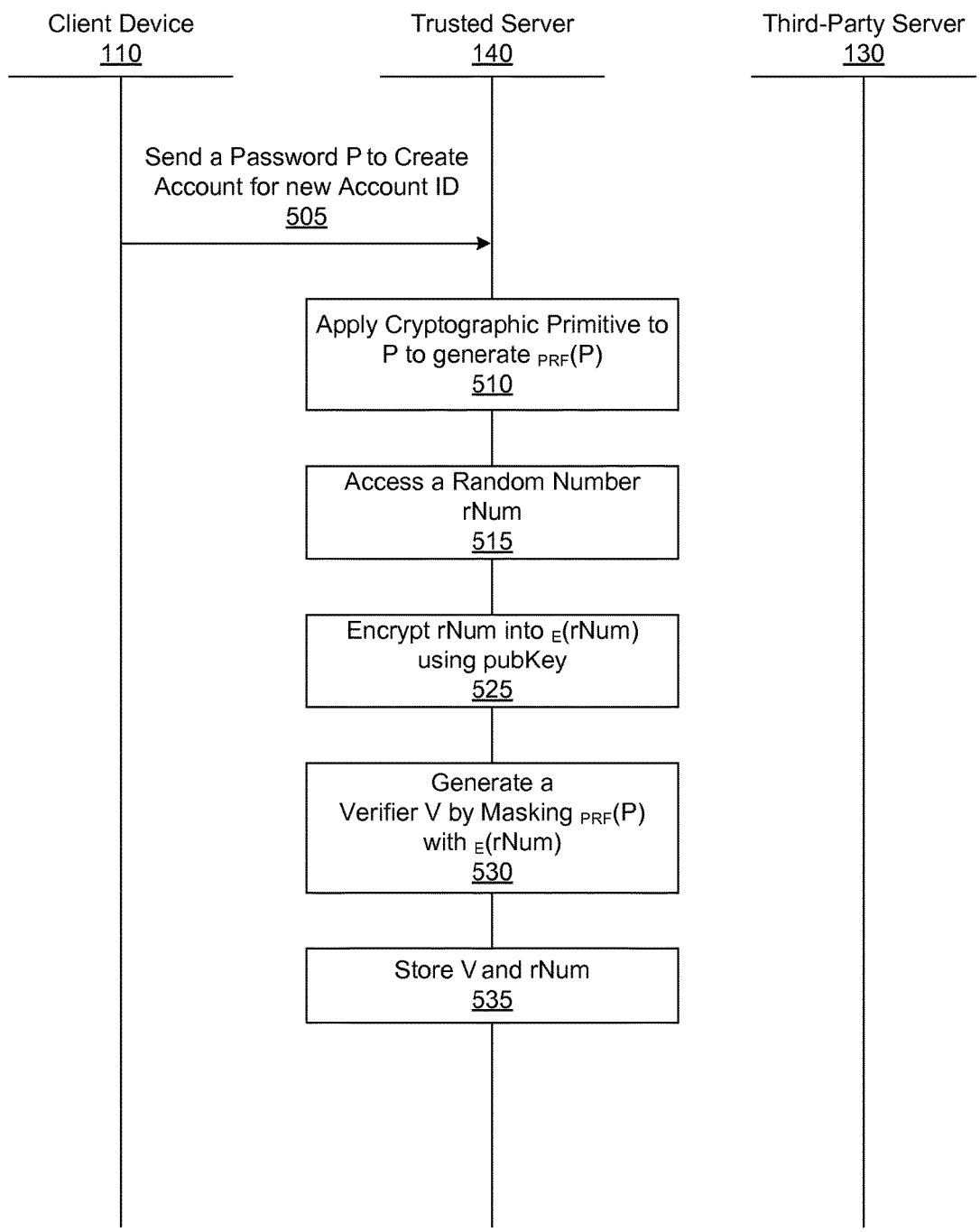
FIG. 5 is an interaction diagram of a method for securely creating an account using a trusted server and a public key provided by a third-party server, according to one embodiment.

In another embodiment, the trusted server 140 performs a cryptographic primitive on the plaintext password P and the random number rNum is separately encrypted using public key cryptographic operations. Additional schemes can be used to strengthen the encryption including padding schemes. The trusted server 140 then performs additional cryptographic primitives on these two pieces of data and masks them together into the verifier. Again, there are at least three cryptographic primitives taking place to generate the verifier and all three cryptographic primitives take place on the trusted server 140. In the embodiment of FIG. 5, in addition to the verifier, the random number rNum is also stored, for example, in the verifier store 170. This example embodiment is further described with respect to FIG. 5 below.

The account verification module 220 verifies whether a login password matches the account's password by receiving the plaintext login password $P_L$ from the input module 225, accessing the stored verifier, and generating a complimentary verifier cV using the stored verifier V and a cryptographic version of the login password $P_L$. To generate the complementary verifier cV, generally any known cryptographic primitives may be used as long as it matches the process used to generate the verifier initially, thus reversing the operations used to generate the corresponding verifier.

To verify the login password, the account verification module 220 is configured to communicate with the third-party server 130. The exact process used for verification may vary by implementation. In the following two paragraphs, two embodiments for subsequently logging into previously created accounts are described below. The two embodiments correspond to the previous two embodiments for account creation described in 215, respectively, and to FIGS. 4 and 6, respectively.

In one embodiment based on the account creation example embodiments described in the account creation module 215 above and further described with respect to FIG. 3 below, the complementary verifier cV is sent by the trusted server 140 to the third-party server 130 for decryption. The third-party server decrypts cV and sends a status of decryption to the trusted server 140 In one example, if both the verifier V and the complementary verifier cV have been determined using additional strengthening techniques such as padding (e.g., OAEP) in addition to a cryptographic scheme (e.g, RSA) the decryption status can be considered to be a sufficiently robust conclusion that the trusted server 140 can rely on the decryption status to report that the login password is correct. Based on the decryption status, a login status is sent to a client device 110. The decryption status may, for example, be an indication of success or failure of the decryption. Thus, a decryption status indicative of successful decryption results in a login status allowing access of the user to a corresponding account. This example embodiment is further described with respect to FIG. 4 below.

A danger of relying on a decryption status is the potential for the intermediate server 150 to send a false positive decryption status to the trusted server 130. Therefore, another verification embodiment can be used as described with respect to FIG. 6. below.

In another embodiment based on the account creation example embodiment described in the account creation module 215 above and further described with respect to FIG. 5 below, the complementary verifier cV is sent by the trusted server 140 to the third-party server 130 for decryption. The third-party server 130 decrypts the complementary verifier cV into decryption $_D(cV)$ using a private key privKey. The decryption $_D(cV)$ is sent to the trusted server 140 by the third-party server 130 and the trusted server 140 compares the decryption $_D(cV)$ with a previously stored random number rNum. Based on the comparison, a match status is determined and sent to a client device used by the user. This example embodiment is further described with respect to FIG. 6 below.

In a variation on this example, a hash of rNum can be stored instead rNum itself, thereby saving storage space in store 170 and further manipulating the data rNum in the even store 170 is dumped. Then, upon receipt of decryption $_D(cV)$, the trusted server 140 performs the same hash on the decryption $_D(cV)$ to determine the match status.

In yet another variation on this example, blinding can be performed on the complementary verifier cV before it is sent to the third-party server 130 for decryption. Then, upon receipt of decryption $_D(cV)$, the trusted server 140 performs a reverse operation to remove the blinding of $_D(cV)$. The blinding operation can be different for each decryption request, ensuring that even if the exchange with the third-party server is intercepted, the data received is meaningless to its recipient. Other embodiments of this variation may use other or additional cryptographic primitives beyond blinding.

Those of skill in the art will appreciate that the trusted server 140 may contain other modules appropriate for its functionality. However, these modules are not described herein to maintain clarity and brevity. Additionally, conventional elements such as firewalls, network management tools, load balancers, are also not shown for similar reasons.

The trusted server 140 may be implemented using a single computer, or a network of computers, including cloud-based computer implementations. The computers are preferably server class computers including one or more high-performance computer processors and main memory, and running an operating system such as LINUX or variants thereof. The operations of the trusted server 140 as described herein can be controlled through either hardware or through computer programs installed in non-transitory computer storage and executed by the processors to perform the functions described herein. The verifier store 170 is implemented using non-transitory computer readable storage devices, and suitable database management systems for data access and retrieval. The verifier store 170 is implemented in a database management system, such as a relational database (e.g., MySQL). The trusted server 140 may also include other hardware elements necessary for the operations described here, including network interfaces and protocols, input devices for data entry, and output devices for display, printing, or other presentations of data. As should be apparent from this description, the operations and functions of the trusted server 140 are sufficiently complex as to require an their implementation on a computer system, and cannot be performed as a practical matter in the human mind.

III.A Secure Account Creation

FIG. 3 is an interaction diagram of a method for securely creating an account using both a trusted server and a third-party server, according to one embodiment. The trusted server 140 receives 305 a password P from a client device 110 as part of a request to create an account. The trusted server 140 applies 310 one or more cryptographic primitives on the password to generate $_{PRF}(P)$, where PRF represents pseudo-random function indicating the application of one or more cryptographic primitives. In one embodiment, the cryptographic primitive is a one-way function (e.g., hash function). A one-way function is a function that is easy to compute on an input (e.g., a password) but difficult to determine an input for a known output. An example includes SHA3-256, though others are possible such as MD5, SHA1, SHA2-256, SHA2-512, SHA3 (Keccak) and RIPEMD. The cryptographic primitive can also include use of a salt. A salt is an additional input for a one-way function that serves to further obfuscate the output of a hash. For example, a salt may be an additional input (e.g., a random number) that is concatenated with the input prior to the carrying out of the one way function. Thus, if two users have the same password, the use of different or unique salts for each of the two passwords results in two different outputs of the hash function, further strengthening the account creation and verification processes. The cryptographic primitive applied to password P to get $_{PRF}(P)$ may also use or include any other suitable data manipulation technique or method. For example, the cryptographic primitive can be used to pad the bit length of the password to a predetermined bit length, such as the standard bit length used in public key cryptography schemes. This additional padding may be standardized (e.g., a string of 0's or 1's) allowing easier verification of proper decryption back into $_{PRF}(P)$ after further cryptographic operations.

The trusted server 140 accesses 315 a random number rNum to associate with the account. For example, the random number rNum may be accessed 315 from the random number generator 210 in one embodiment. The trusted server 140 encrypts 320 the random number using a public key cryptographic operation using a public key (pubKey). The type of public key cryptography scheme used can vary by implementation. Example schemes include RSA (or any variant including RSA OAEP), El Gamal, ECIES (elliptic-curve integrated encryption system), Paillier cryptosystem, Cramer-Shoup cryptosystem, any other suitable public key cryptographic operation scheme or any other homomorphic encryption scheme.

The trusted server 140 can also apply one or more cryptographic primitives on the random number into $_E$(rNum) with the pubKey. In some embodiments, additional schemes (e.g., padding schemes, processing schemes) can be used to further strengthen the pubKey encryption. For example, schemes such as Optical Asymmetric Encryption Padding (OAEP) and the PKCS 1.5 may provide further security to the cryptographic random number.

The trusted server 140 then generates 325 a verifier V by masking the cryptographic password $_{PRF}$(P) with the encrypted number $_E$(rNum). The masking 325 can be based on a function using the cryptographic password $_{PRF}$(P) with the encrypted number $_E$(rNum) as inputs.

The masking function can be any suitable logical operator (e.g., AND, OR, XOR, XNOR) or an invertible function (e.g., a commutative masking function) such as multiplication, modular multiplication in a prime group, arithmetic addition, addition, or any other suitable invertible function. This ensures that during the login verification process, the login password provided can be checked properly without needing to expose account data (such as the password or encrypted versions thereof) in performing the verification. For example, the masking function may be a bitwise operation between the cryptographic password $_{PRF}$(P) with the encrypted number $_E$(rNum). In one example, the cryptographic password is $$_E(P)=0011$$

and the encrypted random number is $$E(rNum)=1100.$$

In some embodiments, the trusted server 140 does not apply one or more cryptographic primitives on the password to generate $_{PRF}$(P) because the masking function acts as the one or more cryptographic primitives, making an additional application of cryptographic primitives on the password unnecessary. Using a masking function, such as bitwise XOR, the verifier V is $$V=_E(P)\oplus_E(rNum)$$

$$V=0011\oplus1100$$

$$V=1111.$$

The verifier V is stored 330 in the verifier store 170.

Applying one or more cryptographic primitives and storing a new verifier based on the cryptographic password via this process has several benefits. If the verifier store 170 is dumped, decrypting the verifiers requires active access to the HSM as well as the trusted server 140 to perform a successful decryption. Thus, the passwords cannot be brute-force decrypted using the verifies through mere access to the verifier store 170.

III.B Verification of Logins Using a Third-Party Server for Decryption

Figure 4:
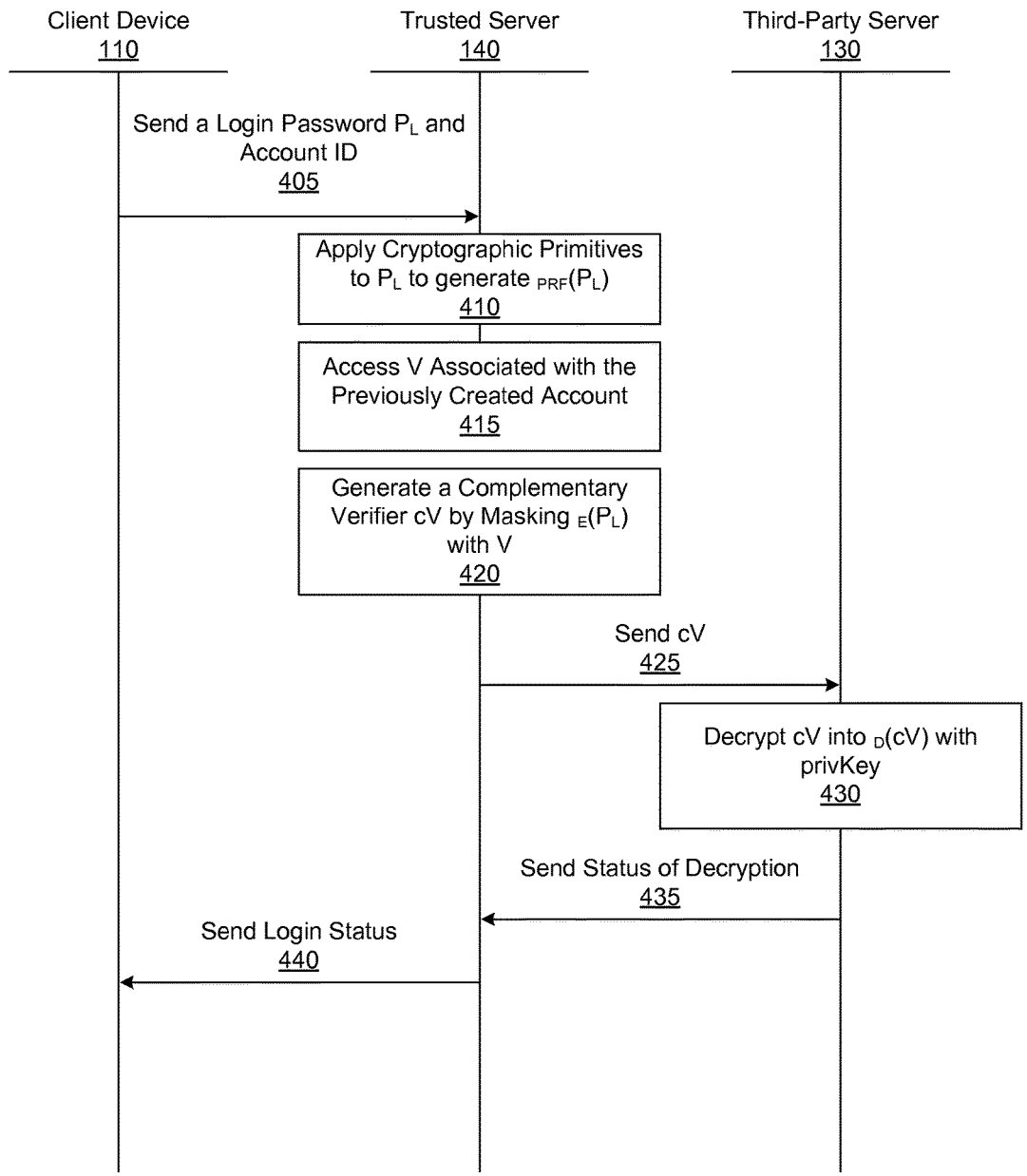
FIG. 4 is an interaction diagram of a method for verifying a login attempt for an account using a trusted server and a third-party server where at least some decryption is performed on the third-party server, according to one embodiment.

FIG. 4 is an interaction diagram of a method for verifying a login attempt for an account using a trusted server and an third-party server where at least some decryption is performed on the third-party server, according to one embodiment. In this example, the process for login verification described in FIG. 4 assumes that cryptographic primitives were applied on the actual password P for the account to generate a verifier V according to the process described above with respect to FIG. 3, however this is not necessarily the case.

The trusted server 140 receives 405 an account ID and a login password $P_L$ for verification from a client device 110. One or more cryptographic primitives (e.g., hash, salt, etc.) are applied 410 to the login password to generate $_{PRF}(P_L)$ by the trusted server 140 using a same cryptographic process as was used during account creation, as described previously in step 310 of FIG. 3. The trusted server 140 accesses 415 a verifier V associated with the received account ID. In one embodiment, the masked password is accessed 415 through the verifier store 170.

The trusted server 140 generates 420 a complementary verifier cV by masking the cryptographic login password $_{PRF}(P_L)$ with the verifier V. The trusted server 140 can mask the cryptographic login password $_{PRF}(P_L)$ with the verifier V using an "inverse" masking function to remove the original mask from the masking function in step 340 of FIG. 3 above. If the masking function is an invertible operation, the masking function used to mask the cryptographic login password $_{PRF}(P_L)$ with the verifier V is the same masking function as was used to mask the cryptographic password $_{PRF}$(P) and the encrypted random number $_E$(rNum), as described in step 340 of FIG. 3 above.

The trusted server 140 sends 425 the complementary verifier cV to the third-party server 130. The third-party server 130 decrypts 430 the complementary verifier cV into $_D$(cV) using the public key decryption and the privKey associated with the third-party server 130, where the public key decryption algorithm is the decryption algorithm corresponding to the cryptography scheme used to encrypt rNum into $_E$(rNum) using the pubKey as described in step 330 of FIG. 3 above. The request from trusted server 140 to perform the decryption 430 may also include instructions to perform the decryption as well.

The third-party server 130 sends 435a decryption status back to the trusted server 140. For example, the login status is then communicated 440 from the trusted server 140 to the client device 110. The decryption process may fail for the complementary verifier cV. This may be the case where additional padding or processing schemes were used such as OAEP. In some decryption algorithms, the decryption will fail mid-way through if certain parts of the data to be decrypted are not decrypted correctly, such as padding bits added to $P_M$* by OAEP. In this instance, the match status reported back may also be that of a failed match, or merely the failure of decryption.

If a malicious actor is recording 160B-D traffic between the trusted server 140 and third-party server 130, all they will be able to record is the decryption status and the complementary verifier cV. Further, without the private key and because any account information is obscured by masking and encryption, the items listed above are useless for brute force password decryption, even if the verifier store 170 were dumped.

The verification process can be further strengthened in several ways, as described immediately below.

III.C Strengthening Verification of Account Logins Using Additional Random Numbers Verification of created accounts can be further strengthened using additional random numbers generated during account creation. More specifically, rather than accessing 315 a single random number, the trusted server 140 may instead access a set of random numbers (e.g., 10) and send the set of random numbers for storage in the verifier store 170. The cryptographic password is masked 325 with each of the encrypted random numbers, resulting in an equivalent number of verifiers as the number of random numbers in the set of random numbers.

During account verification, any of these verifiers can be accessed in step 415 and used to generate 420 a corresponding complementary verifier and the complementary verifier is sent 425 to the third-party server 130 for decryption 430. Generally, a different random number may be used for each login attempt (e.g., $1^{st}$ attempt uses the first number in the set, the $2^{nd}$ attempt uses the second number in the set, and so on), so that each login attempt uses a unique random number, verifier, and complementary verifier. These random numbers may be repopulated each time the user logs in successfully, so that the same random number is never used twice.

As a result, if a malicious actor records a complementary verifier, for example by monitoring the account login process, the malicious actor cannot guarantee that the complementary verifier is the same as the complementary verifier that will be used in a subsequent login attempt.

III.D Strengthening Verification of Account Logins Using a Blinding Factor

Verification of created accounts can be further strengthened using a blinding factor for public-key crypto-systems exhibiting homomorphism such as RSA and Paillier cryptosystems. For example, assume the verifier store 170 also stores 330 the random number rNum it accesses in step 315. During the verification process the trusted server 140 generates a blinding factor (also referred to as a new or additional mask in embodiments herein), m, and applies one or more cryptographic primitives to generate $_E(m)$. The blinding factor m is stored only for the duration of that particular verification process (or verification attempt). The complementary verifier cV is then masked with $_E(m)$.

The trusted server 140 then sends 425 the complementary verifier cV masked with a cryptographic blinding factor $_E(m)$ to perform decryption 430. Decryption status of the decryption status 430 is transmitted back to the trusted server 140. The trusted server 140 receives the decryption status and is able to back out the masking to read the status of the decryption.

As an example of an RSA cryptosystem that is homomorphic under multiplication, assume the blinding factor m is encrypted into $_E(m)$ using the same cryptographic primitive as is used for random number rNum in step 320. The trusted server 140 masks the complementary verifier cV using the encrypted blinding factor $_E(m)$ according to:

$$cV \cdot _E(m) = _E(r\text{Num}) \cdot _E(m) = _E(r\text{Num} \cdot m).$$

The above assumes an example case where the login password matches the user's password. In this example case, the decryption of $cV \cdot _E(m)$ is $$_D(_E(r\text{Num} \cdot m)) = _D(_E(r\text{Num})) \cdot _D(_E(m)) = r\text{Num} \cdot m.$$

The trusted server 140 can use m to perform the same operation in reverse on the decryption and based on the homomorphic property of the RSA public-key crypto-system, determine whether the login password matches the user's password based on whether the result is rNum.

As an example of a Paillier cryptosystem that is homomorphic under addition, assume the blinding factor m is encrypted into $_E(m)$ using the same cryptographic primitive as is used for random number rNum in step 320. The trusted server 140 masks the complementary verifier cV using the encrypted blinding factor $_E(m)$ according to:

$$cV \cdot _E(m) = _E(r\text{Num} + m) = _E(r\text{Num}) \cdot _E(m).$$

The above assumes an example case where the login password matches the user's password. In this example case, the decryption of $cV \cdot _E(m)$ is $$_D(_E(r\text{Num})) \cdot _D(_E(m)) = _D(_E(r\text{Num} + m)).$$

The trusted server 140 can subtract m from the received decryption and, based on the homomorphic property of the Paillier public-key crypto-system, determine whether the login password matches the user's password based on whether the result is rNum.

By using blinding, a malicious actor who is in possession of a previous decrypted $cV_D(cV)$, for example by monitoring the account login process, cannot send fake positive decryption statuses to the trusted server 140. For example, the malicious actor may find that $_D(cV)$ was X and send a decryption status associated with X to the trusted server 140. However, the trusted server 140 is expecting a $_D(cV)$ equal to X' given the blinding factor. Thus, the trusted server 140 is expecting a decryption blinded by m and any decryption that is not blinded by that blinding factor will be flagged as false. Therefore, the effect of blinding is that the malicious actor sees different $_D(cV)$s even for a same user logging in with the same password repeatedly.

IV.A Secure Account Creation

FIG. 5 is an interaction diagram of a method for securely creating an account using a trusted server and a public key, according to one embodiment. The trusted server 140 receives 505 an account ID and a password P from a client device 110 to create an account, applies 510 one or more cryptographic primitives on the password to generate $_{PRF}(P)$, and generates 515 a random number rNum in a similar manner as described previously in step 305, 310, and 315 of FIG. 3, respectively.

Using a pubKey, the trusted server 140 encrypts 525 the random number into $_E(r\text{Num})$. The type of public key encryption used may vary by implementation, examples of which are described in conjunction with step 325 in FIG. 3. The encryption 525 can be similar to the encryption described previously in step 320 of FIG. 3.

The trusted server 140 generates 530 a verifier by masking the cryptographic password $_{PRF}(P)$ with the encrypted number $_E(r\text{Num})$, in a similar manner as described previously in step 325 of FIG. 3. The verifier is stored 535 in the verifier store 170. In addition, the random number rNum or the cryptographic random number $_E(r\text{Num})$ are also stored 535 in the verifier store 170.

IV.B Verification of Logins Using a Third-Party Server

Figure 6:
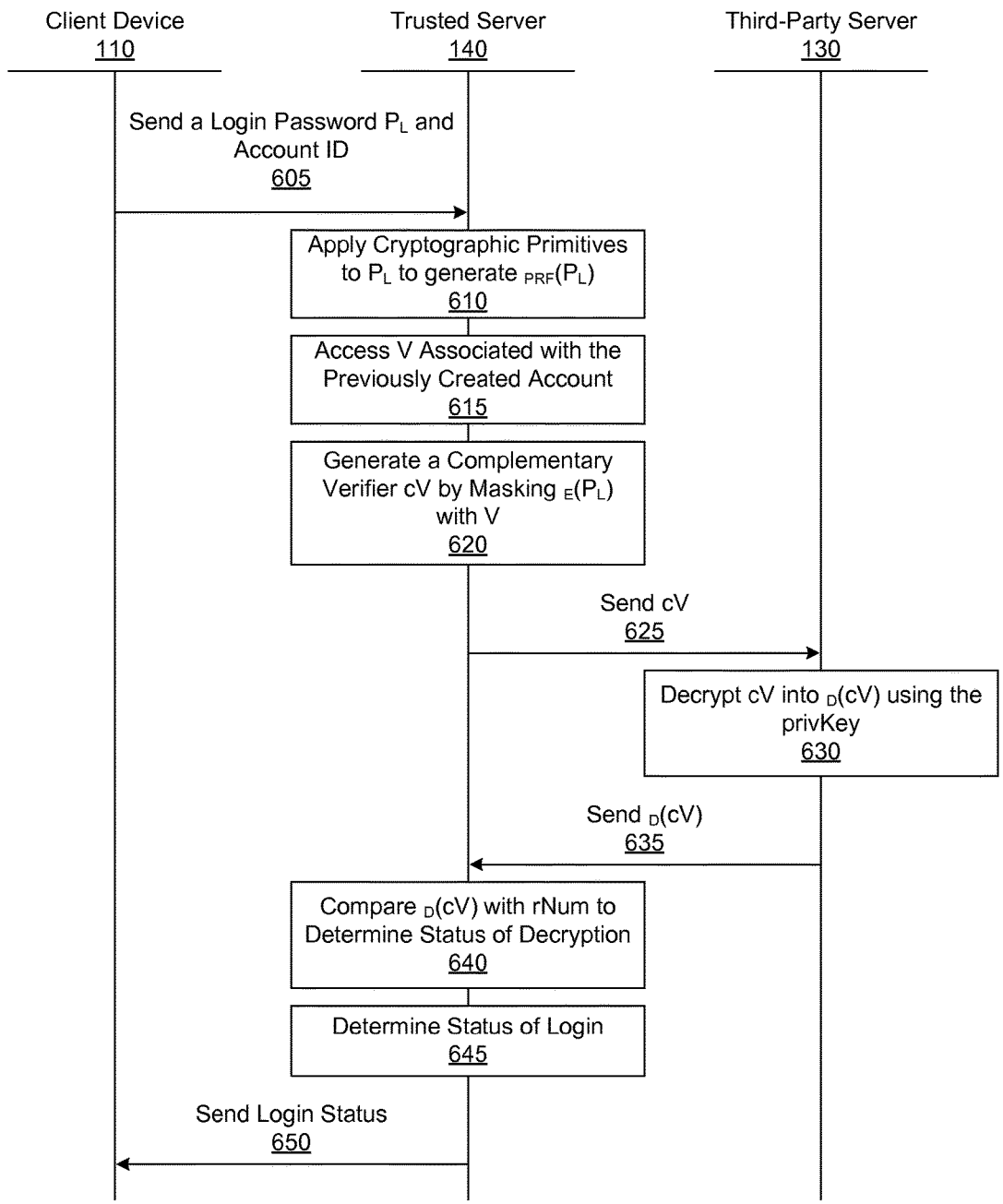
FIG. 6 is an interaction diagram of a method for verifying a login attempt for an account using a trusted server, a public key, and a third-party server where at least some decryption is performed on the third-party server, according to one embodiment.

FIG. 6 is an interaction diagram of a method for verifying a login attempt for an account using a trusted server, a public key, and a third-party server where at least some decryption is performed on the third-party server, according to one embodiment.

The trusted server 140 receives 605 an account ID and a login password $P_L$ from a client device 110, applies 610 one or more cryptographic primitives on the login password to generate $_{PRF}(P_L)$, accesses 615 the verifier V associated with the account ID, and generates 620 a complementary verifier cV by masking $_{PRF}(P_L)$ with V, in a similar manner as described above in conjunction with steps 405, 410, 415, and 420 in FIG. 4, respectively.

The trusted server 140 sends 625 the complementary verifier cV to the third-party server 130. The trusted server 140 may also send 625 instructions to decrypt the complementary verifier cV. The third-party server 130 decrypts 630 the complementary verifier cV into $_D(cV)$ using the privKey stored on the third-party server 130. Decryption 630 is performed using the private key decryption associated with the public key encryption used to encrypt rNum as previously described above in conjunction with step 525 in FIG. 5.

Differently from the verification process described with respect to FIG. 4 above, in the verification process of FIG. 6 the trusted server 140 receives 635 the decryption $_D(cV)$ in addition to or rather than the status of the decryption. The trusted server 140 compares 640 the decryption $_D$(cV) with the stored rNum or cryptographic rNum. If the login password $P_L$ matches the user's original password P, the decryption $_D$(cV) will match rNum or the corresponding cryptographic rNum (e.g., when using a hash function). The trusted server 140 then determines 645 whether the login was successful 645 and reports the result to the client device 110.

If a malicious actor is recording 160B-D traffic between the trusted server 140 and third-party server 130, all they will be able to record is the complementary verifier cV and $_D$(cV). Exposure of $_D$(cV) is a greater risk than the exposure of the decrypt status in the embodiment of FIGS. 3 and 4. However, this protects against a scenario where the intermediate server 150 pretends to send a successful decryption status indication, not guaranteeing the status came from the third-party server 130.

Similarly to the prior embodiment, this verification process can also be further strengthened in several ways, as described below.

IV.C Strengthening Verification of Account Logins Using Multiple Masked Passwords $P_M$ Verification of created accounts can be further strengthened using additional random numbers during account creation as described with respect to the embodiment of FIG. 3 above. During account creation, a set of random numbers (e.g., 10) is accessed 515 and encrypted 525 by the trusted server 140 using the pubKey. Then, the cryptographic password is masked 530 with each of the encrypted random numbers, resulting in an equivalent number of verifiers as the number of random numbers in the set of random numbers.

During account verification, any of the verifiers can be accessed 615 and used to generate 620 the complementary verifier cV. When the complementary verifier cV is sent 625 to the third-party server 130 for decryption 630 and sent back to the trusted server 140 for verification 640, the trusted server 130 correlates the received verifier with the corresponding stored random number from the set.

The benefits of using additional random numbers are the same as described with respect to the embodiment of FIG. 3 above.

IV.D Strengthening Verification of Account Logins Using a Blinding Factor

Verification of created accounts can be further strengthened using a temporary blinding factor, in a similar manner as described previously. The trusted server 140 generates the blinding factor m to blind the complementary verifier cV with during account verification as described in the method of FIG. 6. By using blinding, a malicious actor who is in possession of a previous decrypted cV $_D$(cV), for example by monitoring the account login process, cannot send fake positive decryption statuses to the trusted server 140. The trusted server 140 is expecting a decryption blinded by m and any decryption that is not blinded by that blinding factor will be flagged as false. Therefore, the effect of blinding is that the malicious actor sees different $_D$(cV)s even for a same user logging in with the same password repeatedly. As above, the blinding factor may be deleted after a short time to prevent later breach attempts.

V. Additional Considerations

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110A" and/or "110B" in the figures).

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information (also referred to as data). Examples include passwords, random numbers, blinding factors, and various permutations thereof. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
receiving, at a trusted server, a login request comprising a login password and an account ID;
applying one or more cryptographic primitives to the login password to generate a cryptographic login password;
accessing a previously stored verifier associated with the account ID, the verifier generated by masking, using an invertible masking operation, a cryptographic version of an original account password with an encrypted version of a random number;

masking, at the trusted server using the invertible masking operation, the cryptographic login password with the verifier to generate a complementary verifier that obfuscates the login password;

sending a decryption request to an untrusted server communicatively coupled to the trusted server but physically located in a distinct piece of computer hardware different from that of the trusted server, the decryption request comprising the complementary verifier, the decryption request causing the untrusted server to:
attempt to decrypt the complementary verifier using private key decryption, the private key stored by the untrusted server, and receiving a decryption status at the trusted server from the untrusted server; and determining, at the trusted server, an outcome of the login request based on the decryption status.

2. The computer implemented method of claim 1, wherein the one or more cryptographic primitives is a hash function that includes a salt.

3. The computer implemented method of claim 1, wherein the invertible mathematical operation includes at least one mathematical operation from a group consisting of: a multiplication operation, an addition operation, an AND operation, an OR operation, an XOR operation, and an XNOR operation.

4. The computer implemented method of claim 1,
wherein the received decryption status indicates that the decrypted complementary verifier matches the random number associated with the account ID; and
responsive to the decryption status, determining that the outcome of the login request is a successful login.

5. The computer implemented method of claim 1,
wherein either the decryption unsuccessful result is received or the received decryption status indicates that the decrypted complementary verifier does not match the random number associated with the account ID; and
responsive to the decryption status, determining that the outcome of the login request is an unsuccessful login.

6. The computer implemented method of claim 1, wherein the complementary verifier is masked with a blinding factor, the method further comprising:
generating the blinding factor at the trusted server;
encrypting the blinding factor at the trusted server; and
blinding the complementary verifier with the blinding factor at the trusted server.

7. The computer implemented method of claim 6, wherein receiving the decryption status further comprises:
determining that the outcome of the login request is an unsuccessful login if the blinding factor is not extracted from the received decryption status within a threshold period of time.

8. The computer implemented method of claim 6, further comprising:
extracting the blinding factor from the received decryption status at the trusted server.

9. A computer implemented method comprising:
receiving, at a trusted server, a login request comprising a login password and an account ID;
applying one or more cryptographic primitives to the login password to generate a cryptographic login password;
accessing a previously stored verifier and a previously stored random number, both of which are associated with the account ID, the verifier generated by masking, using an invertible masking operation, a cryptographic version of an original account password with an encrypted version of a random number;

masking, at the trusted server using the invertible masking operation, the cryptographic login password with the verifier to generate a complementary verifier that obfuscates the login password;

sending a decryption request to an untrusted server communicatively coupled to the trusted server but physically located in a distinct piece of computer hardware different from that of the trusted server, the decryption request comprising the complementary verifier, the decryption request causing the untrusted server to:
attempt to decrypt the complementary verifier using private key decryption, the private key stored by the untrusted server;

receiving a decrypted version of the complementary verifier at the trusted server from the untrusted server;

comparing the decrypted version of the complementary verifier against the previously stored random number; and determining, at the trusted server, an outcome of the login request based on the comparison.

10. The computer implemented method of claim 9, wherein the one or more cryptographic primitives is a hash function that includes a salt.

11. The computer implemented method of claim 9, wherein the invertible mathematical operation includes at least one mathematical operation from a group consisting of: a multiplication operation, an addition operation, an AND operation, an OR operation, an XOR operation, and an XNOR operation.

12. The computer implemented method of claim 9, wherein the complementary verifier is blinded with a blinding factor, the method further comprising:
generating the blinding factor at the trusted server;
applying one or more cryptographic primitives to the blinding factor at the trusted server;
blinding the complementary verifier with the cryptographic blinding factor at the trusted server; and
awaiting receipt of the decrypted version of the blinded complementary verifier at the trusted server from the untrusted server.

13. The computer implemented method of claim 12, wherein receiving the decrypted version of the blinded complementary verifier further comprises:
determining that the outcome of the login request is an unsuccessful login if the blinding factor is not extracted from the received decrypted version of the blinded complementary verifier within a threshold period of time.

14. The computer implemented method of claim 12, further comprising:
extracting the blinding factor from the received decrypted version of the blinded complementary verifier at the trusted server.

15. A non-transitory computer readable storage medium comprising computer program instructions that when executed by a processor causes the processor to:
receive, at a trusted server associated with the processor, a login request comprising a login password and an account ID;
apply one or more cryptographic primitives to the login password to generate a cryptographic login password;
access a previously stored verifier associated with the account ID, the verifier generated, by masking, using an invertible masking operation, a cryptographic version of an original account password with an encrypted version of a random number;

mask, at the trusted server using the invertible masking operation, the cryptographic login password with the verifier to generate a complementary verifier that obfuscates the login password;

send a decryption request to an untrusted server communicatively coupled to the trusted server but physically located in a distinct piece of computer hardware different from that of the trusted server, the decryption request comprising the complementary verifier, the decryption request causing the untrusted server to:
attempt to decrypt the complementary verifier using private key decryption, the private key stored by the untrusted server, and receive a decryption status at the trusted server from the untrusted server; and determine, at the trusted server, an outcome of the login request based on the decryption status.

16. The computer readable storage medium of claim 15, wherein the one or more cryptographic primitives is a hash function that includes a salt.

17. The computer readable storage medium of claim 15, wherein the invertible mathematical operation includes at least one mathematical operation from a group consisting of: a multiplication operation, an addition operation, an AND operation, an OR operation, an XOR operation, and an XNOR operation.

18. The computer readable storage medium of claim 15, wherein the received decryption status indicates that the decrypted complementary verifier matches the random number associated with the account ID; and
responsive to the decryption status, determining that the outcome of the login request is a successful login.

19. The computer readable storage medium of claim 15, wherein either the decryption unsuccessful result is received or the received decryption status indicates that the decrypted complementary verifier does not match the random number associated with the account ID; and
responsive to the decryption status, determining that the outcome of the login request is an unsuccessful login.

20. The computer readable storage medium of claim 15, wherein the complementary verifier is masked with a blinding factor, the method further comprising:
generating the blinding factor at the trusted server;
encrypting the blinding factor at the trusted server; and
blinding the complementary verifier with the blinding factor at the trusted server.

21. The computer readable storage medium of claim 20, wherein receiving the decryption status further comprises:
determining that the outcome of the login request is an unsuccessful login if the blinding factor is not extracted from the received decryption status within a threshold period of time.

22. The computer readable storage medium of claim 20, further comprising:
extracting the blinding factor from the received decryption status at the trusted server.

23. A non-transitory computer readable storage medium comprising computer program instructions that when executed by a processor causes the processor to:
receive, at a trusted server associated with the processor, a login request comprising a login password and an account ID;

apply one or more cryptographic primitives to the login password to generate a cryptographic login password;

access a previously stored verifier and a previously stored random number, both of which are associated with the account ID, the verifier generated by masking, using an invertible masking operation, a cryptographic version of an original account password with an encrypted version of a random number;

mask, at the trusted server using the invertible masking operation, the cryptographic login password with the masked password to generate a complementary verifier that obfuscates the login password;

send a decryption request to an untrusted server communicatively coupled to the trusted server but physically located in a distinct piece of computer hardware different from that of the trusted server, the decryption request comprising the complementary verifier, the decryption request causing the untrusted server to:
attempt to decrypt the complementary verifier using private key decryption, the private key stored by the untrusted server;

receive a decrypted version of the complementary verifier at the trusted server from the untrusted server;

compare the decrypted version of the complementary verifier against the previously stored random number; and determine, at the trusted server, an outcome of the login request based on the comparison.

24. The computer readable storage medium of claim 23, wherein the one or more cryptographic primitives is a hash function that includes a salt.

25. The computer readable storage medium of claim 23, wherein the invertible mathematical operation includes at least one mathematical operation from a group consisting of: a multiplication operation, an addition operation, an AND operation, an OR operation, an XOR operation, and an XNOR operation.

26. The computer readable storage medium of claim 23, wherein the complementary verifier is blinded with a blinding factor, the method further comprising:
generating the blinding factor at the trusted server;
applying one or more cryptographic primitives to the blinding factor at the trusted server;
blinding the complementary verifier with the cryptographic blinding factor at the trusted server; and
awaiting receipt of the decrypted version of the blinded complementary verifier at the trusted server from the untrusted server.

27. The computer readable storage medium of claim 26, wherein receiving the decrypted version of the blinded complementary verifier further comprises:
determining that the outcome of the login request is an unsuccessful login if the blinding factor is not extracted from the received decrypted version of the blinded complementary verifier within a threshold period of time.

28. The computer readable storage medium of claim 26, further comprising:
extracting the blinding factor from the received decrypted version of the blinded complementary verifier at the trusted server.

* * * * *